United States Patent [19]
Paskert

[11] 4,109,693
[45] Aug. 29, 1978

[54] FASTENER
[75] Inventor: Joseph H. Paskert, Lakewood, Ohio
[73] Assignee: Eaton Corporation, Cleveland, Ohio
[21] Appl. No.: 526,887
[22] Filed: Nov. 25, 1974
[51] Int. Cl.² .......................... F16B 37/02; F16B 37/04
[52] U.S. Cl. ........................................ 151/41.75; 85/36
[58] Field of Search .................... 151/41.75; 85/36; 24/73 B

[56] References Cited
U.S. PATENT DOCUMENTS

| 1,953,062 | 4/1934 | Conway | 151/69 |
| 2,115,312 | 4/1938 | Lombard | 151/41.75 |
| 2,121,937 | 6/1938 | Tichota et al. | 85/1 R |
| 2,180,929 | 11/1939 | Murphy | 85/36 |
| 2,291,560 | 7/1942 | Rhodes | 403/357 |
| 2,602,526 | 7/1952 | Dax et al. | 85/36 |
| 2,980,478 | 4/1961 | Woehrle | 24/73 B |

FOREIGN PATENT DOCUMENTS

| 119,061 | 10/1944 | Australia | 85/36 |
| Ad.51,264 | 11/1941 | France | 85/36 |
| 894,966 | 3/1944 | France | 85/36 |
| 376,845 | 11/1939 | Italy | 85/36 |
| 880,263 | 10/1961 | United Kingdom | 24/73 B |

Primary Examiner—Ramon S. Britts
Attorney, Agent, or Firm—H. D. Gordon

[57] ABSTRACT

An improved self-retaining one-piece fastener which provides for non-rotational, longitudinal insertion of an externally threaded fastener and prevents non-rotational, longitudinal removal thereof. The improved fastener includes means for preventing rotation of the improved fastener in a manner suitable for use in blind mounting applications and a locking portion resiliently cantilever mounted in an acute angular relationship and intersecting the axis of the externally threaded fastener.

1 Claim, 5 Drawing Figures

U.S. Patent
Aug. 29, 1978
4,109,693
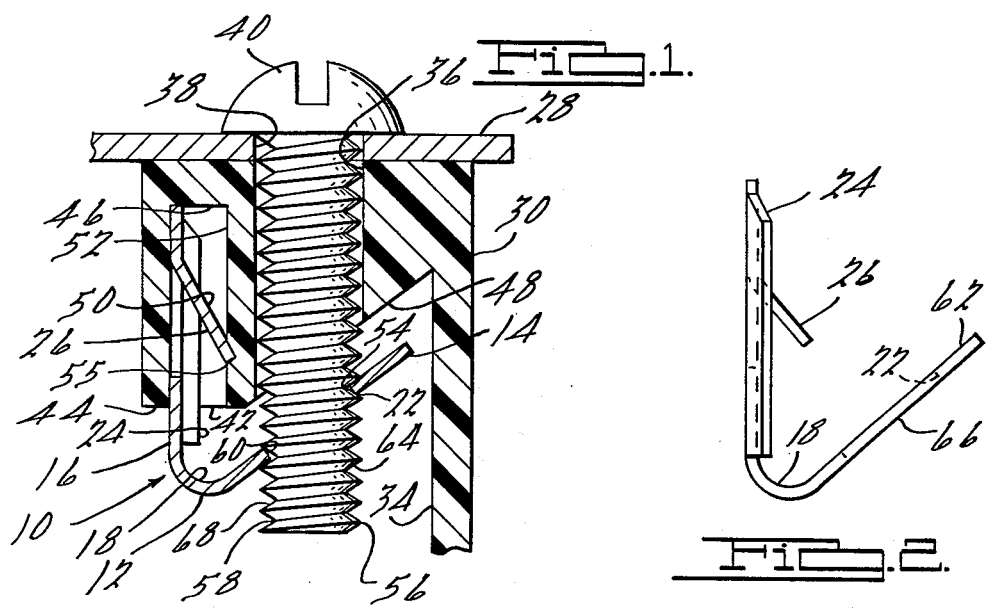
Fig. 1.
Fig. 2.
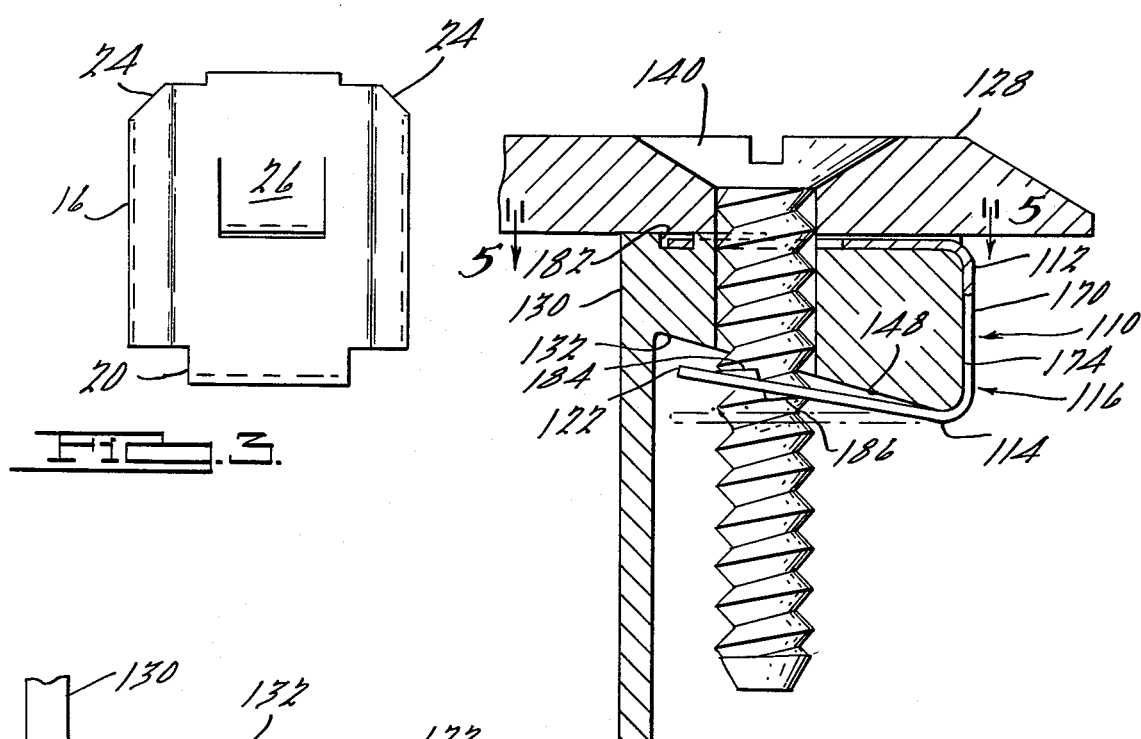
Fig. 3.
Fig. 4.
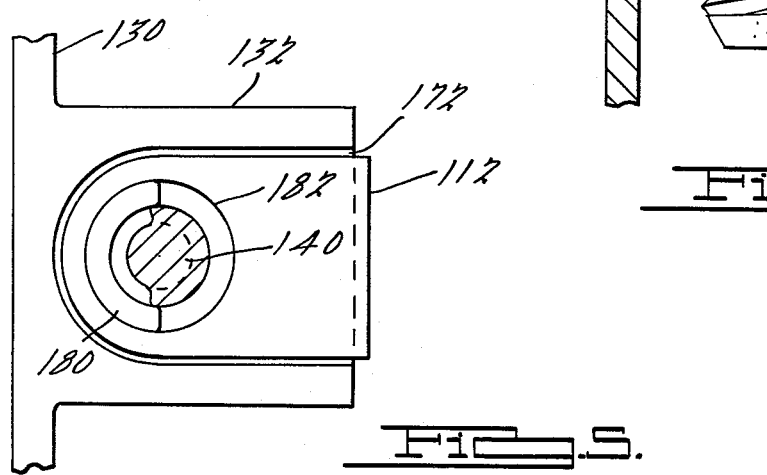
Fig. 5.

FASTENER

BACKGROUND OF THE INVENTION

1. Field of Invention

This invention relates generally to fasteners for receiving externally threaded members and more particularly to self-retaining fasteners for receiving and retaining longitudinally, non-rotationally inserted externally threaded members.

2. Description of the Prior Art

While fasteners for receiving and retaining longitudinally, non-rotationally inserted externally threaded members can be found in the prior art (see, e.g., U.S. Pat. Nos. 1,928,469; 2,149,719, and 2,581,288 and co-pending application of Applicant Ser. No. 467,185, filed May 6, 1974), most have had significant disadvantages in that they have been complicated and expensive to manufacture and have not provided a sufficiently high resistance to longitudinal, non-rotational removal of the externally threaded member for certain fastening applications.

SUMMARY OF THE INVENTION

The disadvantages of the prior art devices have been overcome in the present invention by providing a simple, one-piece resilient spring clip that is self-retaining and which effects locking of non-rotational, longitudinally inserted externally threaded fasteners.

It is an object of the present invention to provide an inexpensively producible, self-retaining, one-piece fastener which provides for non-rotational, longitudinal insertion of an externally threaded member and prevents non-rotational longitudinal removal thereof.

It is a further object of the present invention to provide an inexpensively producible, self-retaining, one-piece fastener which provides for non-rotational, longitudinal insertion of an externally threaded member and provides increased resistance to non-rotational, longitudinal removal thereof over the prior art devices.

According to one feature of the present invention a one-piece resilient clip is provided as the fastener which includes a locking portion cantilever mounted in the path of insertion of the externally threaded member at an acute angle therewith to allow ratcheting insertion of the threaded member.

These and other objects and features will become obvious to those skilled in the fastener art upon reference to the accompanying drawings and written description.

BRIEF DESCRIPTION OF THE DRAWINGS

FIG. 1 is a cross-sectional view of the fastener of the present invention as it is preferably installed.

FIG. 2 is a front elevational view of the fastener of the present invention.

FIG. 3 is a side elevational view of the fastener of the present invention.

FIG. 4 is a cross-sectional view of an alternate embodiment of the fastener of the present invention in an alternative installation.

FIG. 5 is a cross-sectional view taken along line 5—5 in FIG. 4.

DESCRIPTION OF THE PREFERRED EMBODIMENT

Referring now to the drawings and in particular to FIGS. 1, 2 and 3 the self-retaining fastener 10 is illustrated as being a generally V-shaped clip 12 formed of a resilient material, typically spring steel sheet metal. The clip 12 includes a generally rectangular locking portion 14 and a generally rectangular fastener retaining portion 16 suitably formed to describe an included angle of approximately 45 degrees. A continuous bend radius 18 is maintained and the material cross section is reduced (as may best be seen in FIG. 3) at the intersecting portion 20 between locking portion 14 and the retaining portion 16 to minimize stress concentrations and to enhance the capability of locking portion 14 and the retaining portion 16 to rotate with respect to one another about the axis of intersecting portion 20.

The locking portion 14 has an aperture 22 formed through it. The aperture 22 is preferably circular in cross-section, but those skilled in the fastener art will realize that other configurations may be used successfully.

The retaining portion 16 is bent to form a pair of flexure enhancing ribs 24 extending inwardly with respect to the included angle and includes a centrally located inwardly extending spring tab 26.

The usefulness of the fastener 10 is best seen by reference to FIG. 1 in which a typical installation is illustrated, i.e., the joining of a cover plate 28 to a housing 30.

Provision for use of the fastener 10 is made in the design of the housing 30. The housing is preferably, but not necessarily formed of a readily locally deformable material such as a plastic and normally includes a plurality of mounting bosses 32, which are illustrated as extending inwardly from the wall 34 of housing 30. A clearance bore 36 extends through each boss 32 to register with a similar clearance bore 38 formed through the cover plate 28. These bores are approximately sized to receive an externally threaded member which shall hereinafter be referred to as a screw 40. A rectangular slot 42 is formed in the boss 32 spaced inwardly from the clearance bore 36 and extending upwardly (as viewed in FIG. 1) from the substantially flat bottom surface 44 to a stopping surface 46 in the embodiment shown in FIG. 1. Other configurations employing through slots rather than the blind slot described are also possible, however.

An inclined bottom surface 48 extends upwardly and outwardly from the flat bottom surface 44 to the housing wall 34 to form an acute included angle of approximately 45° with the axis of the clearance bore 36.

In the preferred cover plate housing joining configuration illustrated in FIG. 1 the retaining portion 16 of the fastener 10 is slidably received in the slot 42, bottoming on surface 46. Spring tab 26 is compressed as its leading edge 50 contacts the outer wall 52 of the slot 42. Exertion of force tending to longitudinally remove the fastener 10 from the slot 42 urges the trailing edge 54 of the spring tab 26 into the wall 52, causing locking plastic deformation in the embodiment illustrated in FIG. 1.

With the fastener 10 so installed the locking portion 10 is resiliently cantilever mounted intersecting the axis of the clearance bore 36 at approximately a 45° angle. It has been found, however, that the installation is acceptable if the included angle between the locking portion 16 and the retaining portion 14 is in the range of 45 to 51 degrees. In this installed position the outer edge 54 of the aperture 22 is spaced slightly inward from the major diameter of the screw 40 so that the peaks 56 of the screw thread engage the locking portion 14 at this point upon longitudinal insertion of the screw 40. This causes clockwise (as viewed in FIG. 1 and shown in dotted lines in FIG. 4) rotation of the locking portion 14 as the screw 40 moves downwardly until the outer edge 54 of aperture 22 clears a major diameter peak 56 of the screw 40. The resilient locking portion 14 then is urged in a counterclockwise direction into a valley 58 of the thread until further downward movement of the screw 40 reverses the rotation of the locking portion 14 to allow edge 54 of aperture 22 to clear a peak 56 of the thread. Ratcheting insertion of the screw 40 is thus effected.

It should be noted that inner edge 60 of aperture 22 is preferrably symmetrically positioned about the axis of aperture 22 with respect to outer edge 54 so that within production tolerances the ratcheting contact described may occur at the corresponding surfaces.

When the head of the screw 40 is bottomed on the plate 28, the top surface 62 of locking portion 14 is resiliently urged against a bottom surface 64 of a valley 58 of the thread of the screw 40 and/or the bottom surface 66 of the locking portion 14 is urged against a top surface 68 of a valley 58. Locking rotation of the screw 40 causes minor counterclockwise and sliding movement of the locking portion 14 toward locking engagement at the root diameter of the thread. This full engagement of the fastener 10 with the threads of the screw 40 provides a resistance to non-rotational, longitudinal removal, i.e., a pull-out force, higher than previously attainable with fasteners of this type.

Referring now to FIGS. 4 and 5 an alternate embodiment is illustrated which is essentially identical to that shown in FIG. 1 except as it relates to the retaining function. In this configuration the fastener 110 is illustrated as comprising a generally U-shaped clip 112 having a locking portion 114 which may be identical to that previously described but which in FIG. 4 is illustrated as including a further alternative construction which may be used with either this configuration or that of FIG. 1.

The locking portion 114 is resiliently cantilever mounted in angular relationship to a screw 140 from a retaining portion 116 and forms an acute included angle of approximately 45° therewith. (It should be clear from the prior discussion, however that the locking portions 14 and 114 could be carried by other independent structure). This retaining portion 116 comprises a straight side portion 170 and a flat top portion 172 extending perpendicularly therefrom.

In the installation configuration illustrated in FIG. 4 a cover plate 128 having a plurality of clearance bores 138 formed therethrough is joined to a housing 130 having a plurality of inwardly extending mounting bosses 132 (As with bosses 32 outward extension is also possible) through which clearance bores 136 are formed. The bosses 132 include inclined bottom surfaces 148, vertical inner side surfaces 174, and flat top surfaces 176. Material is removed from the top surface 176 of boss 132 describing a substantially rectangular channel 178 (as may best be seen in FIG. 5) extending from inner surface 174 and having a raised semicircular portion 180 at the inner edge of the clearance bore 136. The channel 178 is sized to receive the top portion 172 of the clip 112 through which is formed a clearance bore 182 sufficiently large to encompass the raised semicircular portion 180 when the straight side portion 170 of the clip 112 abuts the boss 132. The clip 112 is thereby locked in place in a position providing resilient cantilever support for the locking portion 114.

Also illustrated in FIG. 4 is an alternative configuration for an aperture 122 to be formed through locking portion 114. In this configuration a substantially circular hole is helically formed by use of suitable punching dies so that a top helical bearing surface 184 and a bottom helical bearing surface 186 are formed to maximize the frictional locking surface presented to the thread of the screw 40 or 140 by the fastener 10 or 110.

I claim:

1. A self-retaining fastener for lockingly engaging, upon rotational tightening, a longitudinally, non-rotationally inserted screw, and for preventing longitudinal, non-rotational removal thereof, the (A) a retaining portion adapted to be non-rotationally positioned proximate the end opposite that end from which the screw is to be inserted of a clearance bore adapted to receive said screw, said retaining portion comprising a retaining arm resiliently attached to said locking portion and forming an acute included angle therewith, said retaining arm including a spring tab extending outward from one side of said retaining arm; and (B) a generally flat locking portion resiliently cantilever carried by said retaining portion and having formed therethrough a generally circular aperture sized to accept the major diameter of said screw, said locking portion having a relaxed position wherein said locking portion is disposed in an angular relationship relative to the axis of the clearance bore such that the axis of said aperture describes an acute angle with the axis of the clearance bore, said aperture when said locking portion is in the relaxed position hwaving a proportion on a plane normal to the axis of said bore which is smaller than the major diameter of said screw said locking portion being movable in response to the insertion of said screw through said clearance bore to a loaded position wherein the axis of said aperture is more nearly coincident with the axis of said clearance bore thereby allowing the ratcheting insertion of said screw; and being further movable in response to tightening engagement of the inserted screw to a locked position wherein the surfaces of the locking portion adjacent the clearance bore threadedly engage the screw.

* * * * *